US007191437B1

(12) United States Patent
Coatney et al.

(10) Patent No.: US 7,191,437 B1
(45) Date of Patent: Mar. 13, 2007

(54) SYSTEM AND METHOD FOR RELIABLE DISK FIRMWARE UPDATE WITHIN A NETWORKED STORAGE FABRIC

(75) Inventors: Douglas W. Coatney, Cupertino, CA (US); Scott D. Gillette, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 722 days.

(21) Appl. No.: 10/421,441

(22) Filed: Apr. 23, 2003

(51) Int. Cl.
*G06F 11/00* (2006.01)
(52) U.S. Cl. .................... 717/174; 717/168; 717/173; 717/178; 714/15; 714/22; 714/23; 714/24; 726/22
(58) Field of Classification Search ........... 717/174, 717/168, 173, 178; 714/15, 22, 23; 726/22
See application file for complete search history.

(56) References Cited

U.S. PATENT DOCUMENTS

| 5,163,131 A | 11/1992 | Row et al. |
| 5,313,626 A | 5/1994 | Jones et al. |
| 5,355,453 A | 10/1994 | Row et al. |
| 5,485,579 A | 1/1996 | Hitz et al. |
| 5,802,366 A | 9/1998 | Row et al. |
| 5,819,292 A | 10/1998 | Hitz et al. |
| 5,931,918 A | 8/1999 | Row et al. |
| 5,941,972 A | 8/1999 | Hoese et al. |
| 5,963,962 A | 10/1999 | Hitz et al. |
| 6,038,570 A | 3/2000 | Hitz et al. |
| 6,065,037 A | 5/2000 | Hitz et al. |
| 6,138,125 A | 10/2000 | DeMoss |
| 6,233,108 B1 | 5/2001 | Inoue |
| 6,282,670 B1 | 8/2001 | Rezaul Islam et al. |
| 6,425,035 B2 | 7/2002 | Hoese et al. |
| 6,442,711 B1 | 8/2002 | Sasamoto et al. |
| 6,708,231 B1* | 3/2004 | Kitagawa .................... 710/10 |

OTHER PUBLICATIONS

"Storage Area Network" Microsoft Computer Dictionary. Fifth Edition Copyright 2002. Microsoft Press.*
U.S. Appl. No. 10/027,457, Susan M. Coatney et al.

(Continued)

*Primary Examiner*—Robert Beausoliel
*Assistant Examiner*—Matthew Urick
(74) *Attorney, Agent, or Firm*—Cesari & McKenna, LLP

(57) ABSTRACT

A system and method for the reliable firmware update of a disk connected to a fibre channel loop fabric allows the specified filers and other predetermined system devices connected to the fabric to be made aware of a firmware download to the target disk without need of a system broadcast message, and while avoiding an alert or error condition such as those encountered through an FC-AL reset request. The target disk returns a special downloading firmware reject code embedded in a low-level protocol that remains operative during a firmware download. This reject code is recognized by an accessing system device as indicating that the disk is currently downloading updated firmware. In this manner, having recognized the code, the system device holds any I/O operations with respect to the target disk for a given delay time. Thus, the system device does not misinterpret the unavailability of the disk as a failure, leading to an unwanted system-wide FC-AL reset state. In one embodiment, the delay time can be approximately sixty seconds and the accessing device can poll the disk after each delay time until normal operation is restored and the reject request is no longer issued. At that time, full access to the disk is restored.

20 Claims, 4 Drawing Sheets

OTHER PUBLICATIONS

David Hitz et al. TR3002 File System Design for a NFS File Server Appliance published by Network Applicance, Inc.

Common Internet File System (CIFS) Version: CIFS-Spec 0.9, Storage Networking Industry Association (SNIA), Draft SNIA CIFS Documentation Work Group Work-in-Progress, Revision Date Mar. 26, 2001.

Fielding et al. (1999) Request for Comments (RFC) 2616, HTTP/1.1.

ANSI X3. 230-199x Fibre Channel Physical and Signaling Interface (FP-PH) Rev 4.3 Jun. 1, 1994.

* cited by examiner

SYSTEM AND METHOD FOR RELIABLE DISK FIRMWARE UPDATE WITHIN A NETWORKED STORAGE FABRIC

FIELD OF THE INVENTION

This invention relates to networked storage systems and more particularly to systems and methods for updating firmware in networked file servers in a storage area network.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, conversely, may be implemented as a specially formatted file in which information by other files and directories is stored.

A filer may be further configured to operate according to a client/server model of information delivery to thereby allow many clients to access files stored on a server. In this model, the client may comprise an application, such as a database application, executing on a computer that connects to the filer over a computer network. This computer network could be a point to point link, a shared local area network (LAN), a wide area network (WAN) or a virtual private network (VPN) implemented over a public network such as the Internet. Each client may request the services of the file system on the filer by issuing file system protocol messages (typically in the form of packets) to the filer over the network.

As used herein, the term "storage operating system" generally refers to the computer-executable code operable on a storage system that manages data access and may, in the case of filers, implement file system semantics. In this sense, Data ONTAP software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

The storage devices in a file server environment are typically disk drives organized as a disk array, wherein each disk is a self-contained rotating magnetic media storage device. A disk is typically a collection of platters, rotatable on a spindle, with each platter surface divided into concentric tracks, and each track divided into sectors. The sector is the smallest unit that can be individually accessed for input/output (I/O) operations, e.g., read or written. The term disk in this context is synonymous with a hard disk drive (HDD), a direct access storage device (DASD) or a logical unit number (lun) in a storage device. Unless the context indicates otherwise, the term "disk" as used herein is intended to embrace not only magnetic storage devices, but also optical, solid state and other types of storage devices.

The disk storage typically implemented has one or more storage "volumes" comprised of a collection of physical storage disks, defining an overall logical arrangement of storage space. Currently available filer implementations can serve a large number of discrete volumes. Each volume is generally associated with its own file system. The disks within a volume/file system are typically organized as one or more groups of Redundant Array of Independent (or Inexpensive) Disks (RAID). RAID implementations enhance the reliability and integrity of data storage through the redundant writing of data stripes across a given number of physical disks in the RAID group, and the appropriate caching of parity information with respect to the striped data. In the example of a WAFL based file system and process, a RAID 4 implementation is advantageously employed. This implementation specifically entails the striping of data across a group of disks, and separate parity caching within a selected disk of the RAID 4 group.

Typically, each filer is deemed to "own" the disks that comprise the volumes serviced by that filer. This ownership means that the filer is responsible for servicing the data contained on those disks. Only the filer that owns a particular disk should be able to write data to that disk. The maintenance of solo disk ownership helps to ensure data integrity and coherency.

FIG. 1 is a schematic block diagram of an exemplary storage area network (SAN) environment 100. The network 100 is based around a local area network (LAN) 102 interconnection. However, a wide area network (WAN), virtual private network (VPN), or a combination of LAN, WAN and VPM implementations can be established. For the purposes of this description the term LAN should be taken broadly to include any acceptable networking architecture. The LAN interconnects various clients based upon personal computers 104, servers 106 and a network cache 108. Also interconnected to the LAN may be a switch/router 110 that provides a gateway to the well-known Internet 112, thereby enabling various network devices to transmit and receive Internet based information, including e-mail, web content, and the like. Each of the devices attached to the LAN 102 include an appropriate conventional network interface arrangement (not shown) for communicating over the LAN using desired communication protocol such as the well-known Transport Control Protocol/Internet Protocol (TCP/IP), User Datagram Protocol (UDP), Hypertext Transfer Protocol (HTTP), or Simple Network Management Protocol (SNMP).

In this implementation, exemplary filers 114 and 115 are connected to the LAN 102. The filers, described further below are file servers configured to control storage of, and access to, data in a set of interconnected storage volumes. The filers 114, 115 are each connected to one of a multiplicity of ports on a fibre channel switch 113 that also connects to a plurality of a fibre channel arbitrated loops (also termed "FC-AL") 116 and 117. The number of filers and number of loops are highly variable and two of each are shown simply by way of example. A plurality of disks 118, 120 and 122 are shown connected on Fibre Channel Loop I 116. Likewise disks 124, 126 and 128 reside on exemplary Fibre Channel Loop II 117. Again, the number of disks on a given loop is highly variable and three disks are shown only by way of example. Each of these disks (in one exemplary implementation) is part of a volume served by the filer. As described further below, each volume is typically organized to include one or more RAID groups of physical storage disks for increased data storage integrity and reliability. For the purposes of this description, Filer A 114 is deemed to own the disks 118, 120 and 122, while Filer B 115 is deemed to own disks 124, 126 and 128. However, ownership can cross loops. In summary, ownership means that only an "owning" filer can both read from and write to a given set of owned disks, while all other "non-owning" filers can only read from non-owned disks.

All disks, including disks 118, 120 and 122 (attached to Fibre Channel Loop I 116) and disks 124, 126 and 128 (attached to Loop II 117) include their own internal firmware FW that facilitates operation, network communication and control of the respective disk. Occasionally, a vendor may need to update the firmware within one or more disks. At such times, information transfer to and from the disk must be interrupted.

Where a disk is directly attached to the filer or another server (i.e. a non-SAN configuration), the update of the firmware is fairly straightforward and reliable the disk is taken off line by the filer, the firmware update is loaded, and the disk is placed back into operation.

However, when a vendor wishes to provide an update to the existing firmware on one or more disks in a fibre channel fabric, the update is typically transmitted via the respective fibre channel loop 116, 117 to the targeted disk or disks. In order to avoid errors and corruption of downloaded firmware, other system devices connected to the fibre channel loops 116, 117 must be informed that a given disk is currently downloading firmware and, hence, is unavailable. For example, it is possible (as part of the error recovery procedure undertaken by system devices) that certain FC-AL reset requests may be issued by the filer if an owned disk undergoes a firmware download. These reset requests can corrupt the firmware download. To avoid corruption, a more-reliable mechanism of determining when a given disk is undergoing a firmware download is needed.

One such mechanism can comprise a generalized broadcast network message announcing the firmware download that is sent throughout the network. However, a broadcast approach is cumbersome, particularly when the fibre channel fabric is visible to one or more interconnected systems at once and certain disks are only "owned" by certain connected systems and not others. Thus, it is desirable to provide an efficient way to inform only the owning filer that a disk is downloading firmware and is, therefore, temporarily unavailable.

Thus it is desirable to provide a mechanism for notifying other filers/devices on the SAN that a given disk is undergoing a firmware update in a manner so that the download proceeds with the same reliability as a directly attached disk.

SUMMARY OF THE INVENTION

This invention overcomes the disadvantages of the prior art by providing a system and method for the reliable firmware update of a disk connected to a fibre channel loop fabric that allows the specified filers and other predetermined system devices connected to the fabric to be made aware of a firmware download (for firmware update, etc.) to the target disk without need of a system broadcast message, and while avoiding an alert or error condition such as those encountered through an FC-AL reset request. The target disk, returns a special downloading firmware reject code embedded in a low-level protocol that remains operative during a firmware download. This reject code is recognized by an accessing system device as indicating that the disk is currently downloading updated firmware. In this manner, having recognized the code, the system device holds any I/O operations with respect to the target disk for a given delay time. Thus, the system device does not misinterpret the unavailability of the disk as a failure, leading to an unwanted system-wide FC-AL reset state. In one embodiment, the delay time can be approximately sixty seconds and the accessing device can poll the disk after each delay time until normal operation is restored and the reject request is no longer issued. At that time, full access to the disk is restored.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. File Servers/Storage Appliances

Figure 2:
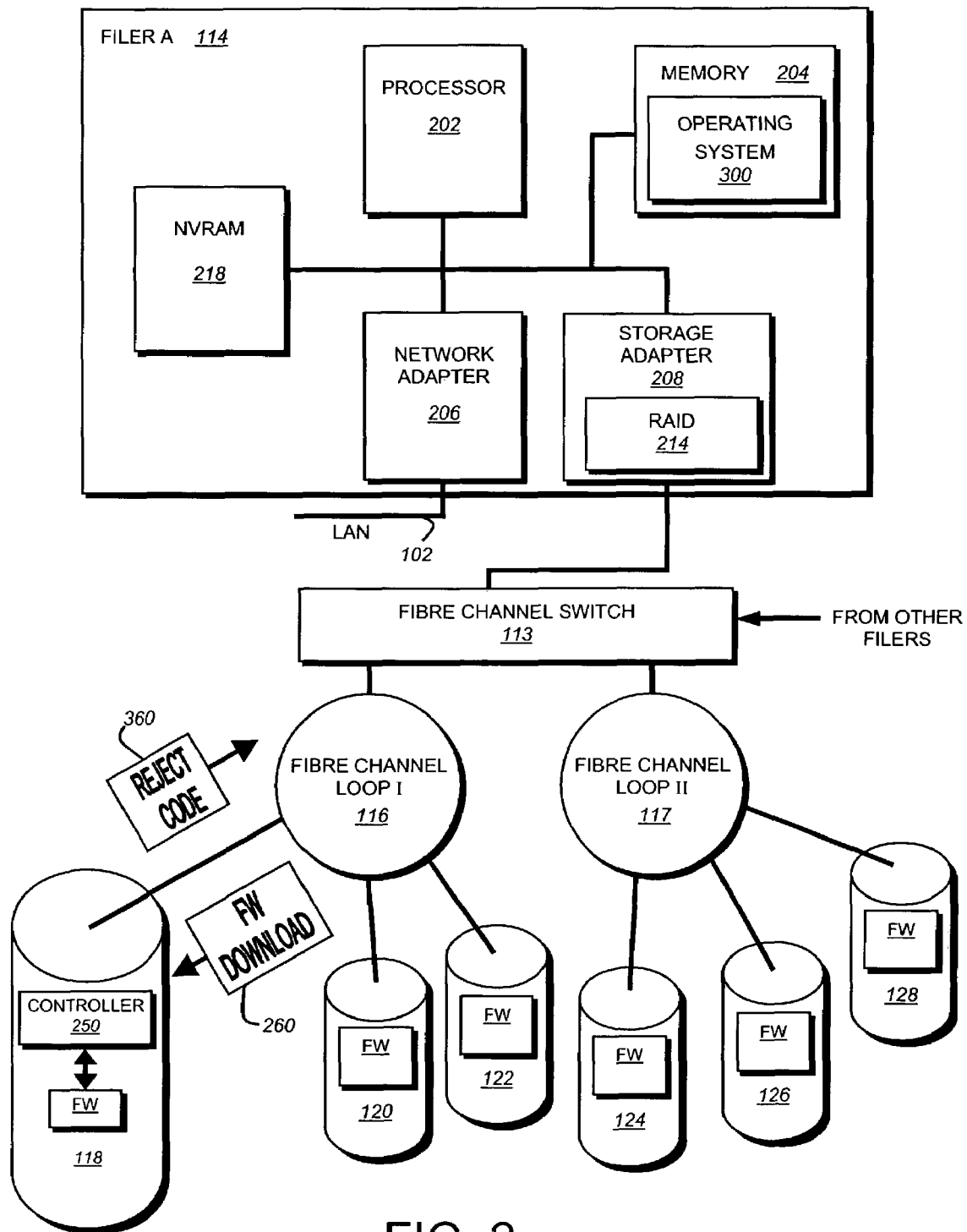
FIG. 2 is a schematic block diagram of an exemplary storage appliance in accordance with FIG. 1.

FIG. 2 is a more-detailed schematic block diagram of illustrative Filer A that is advantageously used with this invention. Other filers or storage appliances can have is similar construction, including, for example, Filer B, etc. Conversely the implementation and architecture of Filer B may vary. By way of background, a file server, embodied by a filer, is a computer that provides file service relating to the organization of information on storage devices, such as disks. In addition, it will be understood to those skilled in the art that the inventive technique described herein may apply to any type of special-purpose computer (e.g., server) or general-purpose computer, including a standalone computer, embodied as a file server. Moreover, the teachings of this invention can be adapted to a variety of file server architectures including, but not limited to, a network-attached storage environment, a storage area network and disk assembly directly-attached to a client/host computer. The term "file server" should therefore be taken broadly to include such arrangements.

The file server comprises a processor 202, a memory 204, a network adapter 206 and a storage adapter 208 interconnected by a system bus 210. The file server also includes a storage operating system 300 that implements a file system to logically organize the information as a hierarchical structure of directories and files on the disk. Additionally, a non-volatile RAM (NVRAM) 218 is also connected to the system bus. The NVRAM is used for various filer backup functions according to this embodiment.

In the illustrative embodiment, the memory 204 may have storage locations that are addressable by the processor for storing software program code or data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organize a file server by inter-alia invoking storage operations in support of a file service implemented by the file server. It will be apparent by those skilled in the art that other processing and memory implementations, including various computer readable media may be used for storing and executing program instructions pertaining to the inventive technique described herein.

The network adapter 206 comprises the mechanical, electrical and signaling circuitry needed to connect the file server to a client over the computer network, which as described generally above, can comprise a point-to-point connection or a shared medium such as a LAN. A client can be a general-purpose computer configured to execute applications including file system protocols, such as the Network File System (NFS) or the Common Internet File System (CIFS) protocol. Moreover, the client can interact with the file server in accordance with the client/server model of information delivery. The storage adapter cooperates with the storage operating system 300 executing in the file server to access information requested by the client. The information may be stored in a number of storage volumes each constructed from an array of physical disks that are organized as RAID groups. The RAID groups include independent physical disks including those storing a striped data and those storing separate parity data.

Figure 1:
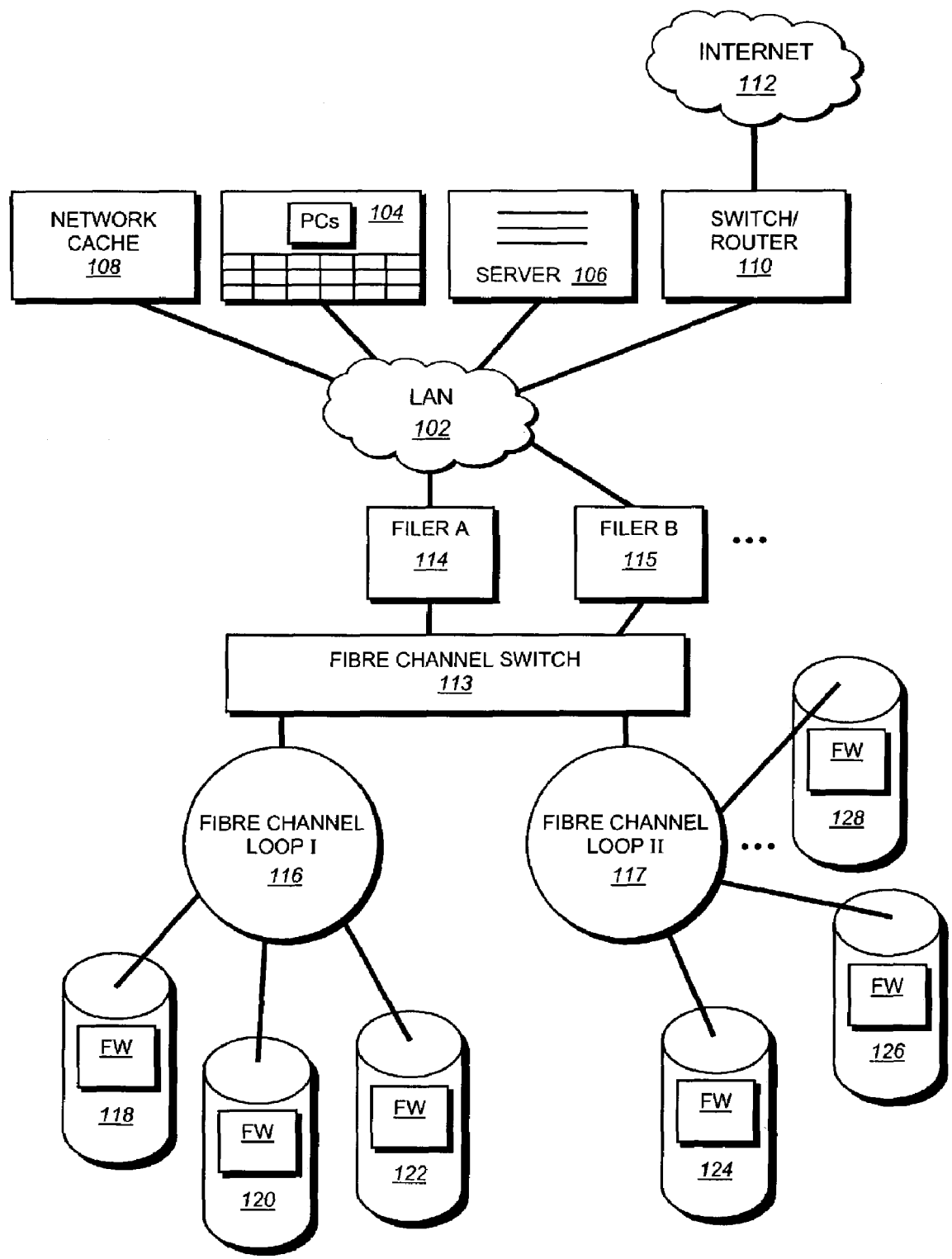
FIG. 1, already described, is a schematic block diagram of a network environment showing the prior art of a filer connected to a fibre channel fabric with multiple fibre channel loops connecting multiple fibre channel disks.

The storage adapter 208 includes input/output interface circuitry that couples to the disks over an I/O interconnect arrangement such as a conventional high-speed/highperformance fibre channel serial link topology. The information is retrieved by the storage adapter, and if necessary, processed by the processor (or the adapter itself) prior to being forwarded over the system bus to the network adapter, where the information is formatted into a packet and returned to the client. Note that a RAID adapter 214 is used to drive the storage layer in this embodiment. Other types of storage organization are expressly contemplated, however. The storage adapter 208 interconnects to the exemplary fibre channel fabric as described with reference to FIG. 1, including (but not limited to) a fibre channel switch 113, loops 116, 117 and associated disks 118, 120, 122 and 124, 126 and 128, respectively.

To facilitate access to the disks, the storage operating system implements a file system that logically organizes the information as a hierarchical structure of directories in files on the disks. Each on-disk file may be implemented as a set of disk blocks configured to store information such as text, whereas the directory may be implemented as a specially formatted file in which other files and directories are stored. In the illustrative embodiment described herein, the storage operating system associated with each volume is preferably the NetApp® Data ONTAP storage operating system available from Network Appliance Inc. of Sunnyvale, Calif. that implements a Write Anywhere File Layout (WAFL) file system. The preferred storage operating system for the exemplary file server is now described briefly. However, it is expressly contemplated that the principles of this invention can be implemented using a variety of alternate storage operating system architectures.

B. Storage Operating System and Disk Ownership

Figure 3:
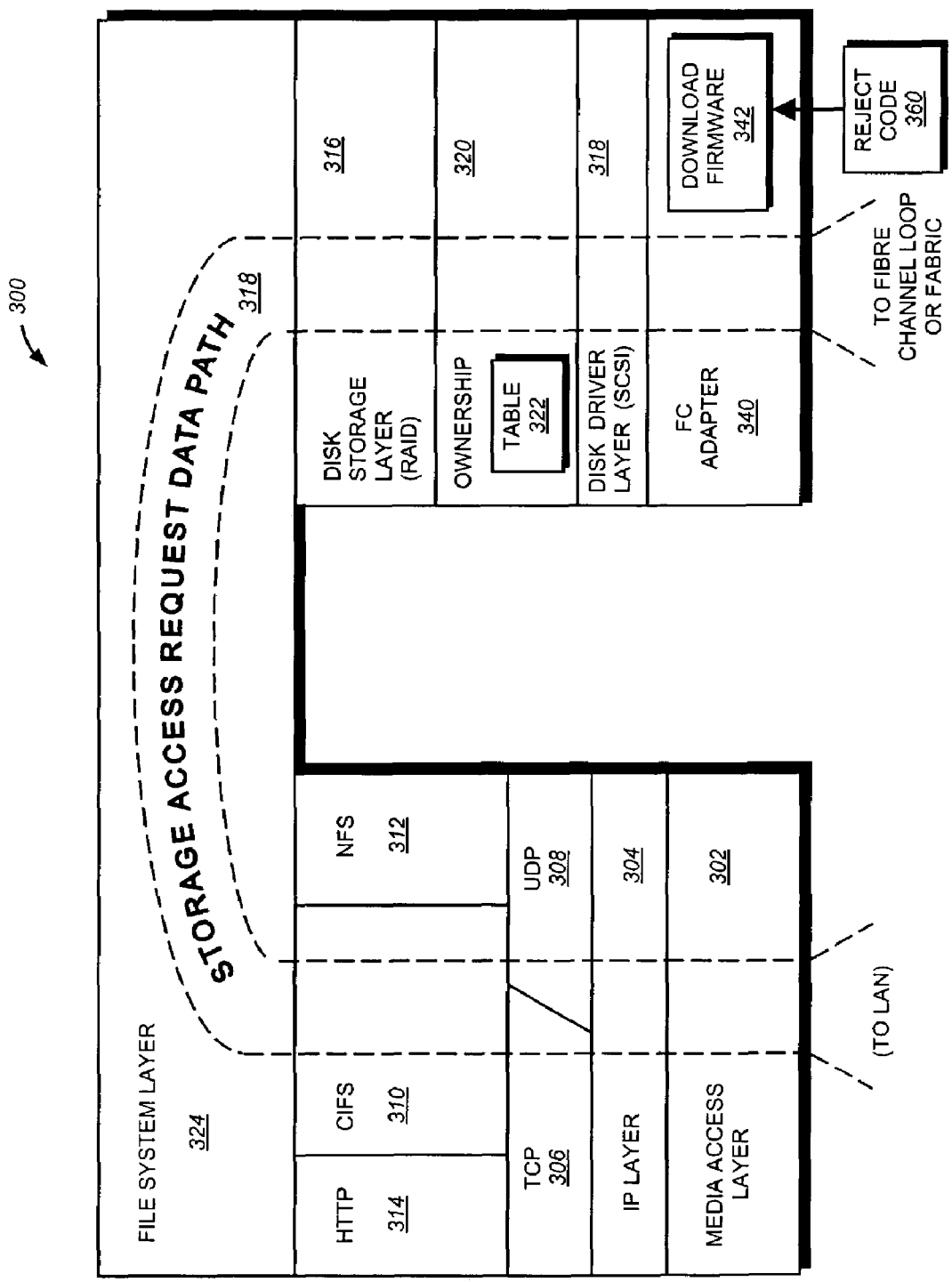
FIG. 3 is a schematic block diagram of a storage operating system for use with the exemplary file server of FIG. 2 according to an embodiment of this invention.

As shown in FIG. 3, the storage operating system 312 comprises a series of software layers including a media access layer 302 of network drivers (e.g., an Ethernet driver). The storage operating system further includes network protocol layers such as the Internet Protocol (IP) layer 304 and its Transport Control Protocol (TCP) layer 306 and a User Datagram Protocol (UDP) layer 308. A file system protocol layer provides multi-protocol data access and, to that end, includes support from the CIFS protocol 310, the Network File System (NFS) protocol 312 and the Hypertext Transfer Protocol (HTTP) protocol 314.

In addition, the storage operating system 300 includes a disk storage layer 316 that implements a disk storage protocol such as a RAID protocol, and a disk driver layer 318 that implements a disk access protocol such as e.g., a Small Computer System Interface (SCSI) protocol. Included within the disk storage layer 316 is a disk and SAN ownership layer 320, which manages the ownership of the disks and/or SAN fabrics to their related volumes. Notably, the disk ownership layer includes program instructions for writing the proper ownership information to sector S (Sector "0" in one example) and to the SCSI reservation tags.

Bridging the disk software layers, with the network and file system protocol layers, is a file system layer 324 of the storage operating system. Generally, the file system layer 324 implements the file system having an on-disk file format representation that is a block based. The file system generated operations to load/retrieve the requested data of volumes if it not resident "in core," i.e., in the file server's memory. If the information is not in memory, the file system layer indexes into the inode file using the inode number to access an appropriate entry and retrieve a logical block number. The file system layer then passes the logical volume block number to the disk storage/RAID layer, which maps out logical number to a disk block number and sends the later to an appropriate driver of a disk driver layer. The disk driver accesses the disk block number from volumes and loads the requested data into memory for processing by the file server. Upon completion of the request, the file server and storage operating system return a reply, e.g., a conventional acknowledgement packet defined by the CIFS specification, to the client over the network. It should be noted that the software "path" 318 through the storage operating system layers described above needed to perform data storage access for the client received the file server may ultimately be implemented in hardware, software or a combination of hardware and software (firmware, for example).

Included within the ownership layer 320 is a disk table 322 containing disk ownership information entries for each disk such as the Drive ID, World Wide Name, owning filer, etc. As noted above, ownership of disks makes the avoidance of a broadcast message to announce firmware download more desirable, as messaging to non-owning devices/filers in a SAN fabric may prove cumbersome or impossible, particularly where disks cross a fabric with multiple switches. This disk table 322 is generated at boot-up of the file server, and is updated by the various components of the storage operating system to reflect changes in ownership of disks. The concept of ownership in a SAN fabric is generally described in U.S. patent application Ser. No. 10/027,457, entitled SYSTEM AND METHOD OF IMPLEMENTING DISK OWNERSHIP IN NETWORKED STORAGE, by Susan M. Coatney et al.

In addition, a Fibre Channel adapter driver layer 340 is shown below the Disk Driver (SCSI) 318 layer. As described below this layer includes an implementation of the Fibre Channel specification including a mechanism 342 for recognizing and acting upon a novel Downloading Firmware Reject Code according to this invention. Note that the Fibre Channel specification referenced herein is FIBRE CHANNEL Physical and Signaling Interface (FC-PH), Rev 4.3, Published by the American National Standards Institute (ANSI), Jun. 1, 1994, and the teachings of this specification are expressly incorporated herein by reference.

C. Download Firmware Reject Code

It is recognized that, during download of firmware updates to a disk drive, the drive is logged out from the network, and only the lowest protocol levels of that drive are active during download. Hence an attempt to log into the drive by the network will, after log-in, essentially, hang without response. This propensity can quickly escalate into an unwanted reset code that can have SAN-wide consequences. In one particular example, the ownership layer 320 may be constantly polling the disks of the fabric to confirm ownership and the failure to obtain a response after log-in could cause the reset condition to occur.

Thus, a low-level protocol, specialized (fibre channel) reject code is provided according to an embodiment of this invention. This reject code is designed to be recognized by specific system devices that are communicating directly with the target disk, such as the filers, which are synchronized so that they recognize the reject code on the target disk. This reject code is a specific "downloading firmware" reject code that is recognized by a function 342 in the adapter layer 340. By "low-level" it is meant that the protocol used to communicate the downloading firmware status be a state-driven messaging system that remains active and operative on the disk drive during a firmware download process. In the illustrative embodiment the low-level protocol is the FC-PH fibre channel protocol engine, as described in the above-incorporated FC-PH 4.3 Fibre Channel specification, which services link services for fibre channel. These link services include the link service log-in frames, FLOGI and PLOGI and link service accept/reject frames, LS_ACC and LS_RJT frames (described further below). Conversely, higher level protocols (SCSI, RAID, etc.) resident on the disk drive are typically disabled during a firmware download.

In the illustrative embodiment, the downloading firmware reject code of this invention is particularly enabled by a generalized REJECT code in accordance with the standards laid out in the above-incorporated FC-PH 4.3 Fibre Channel Specification, (Section 21.5 et seq.), as well as FIBRE CHANNEL FRAMING AND SIGNALING (FC-FS), REV 1.70, NCITS working draft proposed American National Standard for Information Technology, Feb. 8, 2002, NCITS/ Project 1331-D (starting at page 257/Section 12.3.3.1-et seq.), the teachings of which are incorporated herein by reference.

In the illustrative embodiment, the reject code is generated by the fibre channel adapter as part of the Extended Link Service (ELS) Reply Sequence. This is the communication sequence by which an explicit link (log-in) between a system device and a disk is established. This log-in is described in sections 21.4.7 and 23.4 of the above-incorporated FC-PH 4.3 Fibre Channel specification. The explicit log-in consists of a fabric log-in (FLOGI) and followed by a N_Port (e.g. port number N) log-in (PLOGI). More particularly, fabric log-in (FLOGI) by a system device to the target disk involves the transmission of the FLOGI link service sequence specified in the specification. The FLOGI generally accomplishes the following five functions: (a) determining the presence or absence of a fabric; (b) if the fabric is present, providing a specific set of operating characteristics associated with the entire fabric; (c) if the fabric is present, assigning or confirming the native N_Port identifier of the system device that initiated the log-in; (d) if the fabric is not present, indicating that the requesting system device N_Port is attached to a point-to-point topology and (e) if the fabric is present, initializing a buffer-to-buffer credit.

The N_Port log-in (PLOGI) follows the fabric log-in (FLOGI). The PLOGI generally accomplishes the following three functions: (a) providing a specific set of operating characteristics associated with the target disk (destination N_Port), (b) initializing the target disk end-to-end credit or (c) in a point-to-point topology (no fabric), initializing a buffer-to-buffer credit.

Once the log-in sequence (FLOGI and PLOGI) of the link service has completed, a communication link is either accepted (e.g. the message LS_ACC)—in the case of a normally functioning disk ready for I/O, or it is rejected (e.g. the message LS_RJT) when the disk is unable to establish a link. An ELS sequence may be rejected for a variety of reasons including the presence of internal disk I/O faults.

In accordance with this embodiment, during a firmware download to a target disk (for example, disk drive 118 in FIG. 2), its control software/controller 250 senses the α-currence of a firmware download 260. According to the prior art such a disk would simply fail to respond, causing a possible fabric reset. Now, according to this invention, when the exemplary disk 118 receives a login request from a system device, its protocol engine is programmed to generate a unique Link Service Reject (LS_RJT) (message 360 in FIGS. 2 and 3) notifying the system device (through its download firmware module 342 in the FC layer 340) that the request has been specifically rejected.

To create a specialized "downloading firmware" reject code, according to this embodiment; the conventional reject code is adapted to provide a new reason for rejection—i.e. "downloading firmware." According to the above-referenced FC standards, the reject code returned by the target disk drive consists of a fixed "reject" portion followed by a variable "reason" for rejection portion. Typically the reason is a four-byte (in this example) sequence designating some form of unique condition that prevents a link between the requesting system device and target disk from being established.

Also according to this invention, system devices are adapted at their fiber channel layer to recognize the firmware download reason for rejection by the target disk, and therefore, avoid escalating this condition into a reset or other alert. The system device may otherwise initiate an alert or reset if more-serious disk errors are encountered (such as media errors, etc.)

Figure 4:
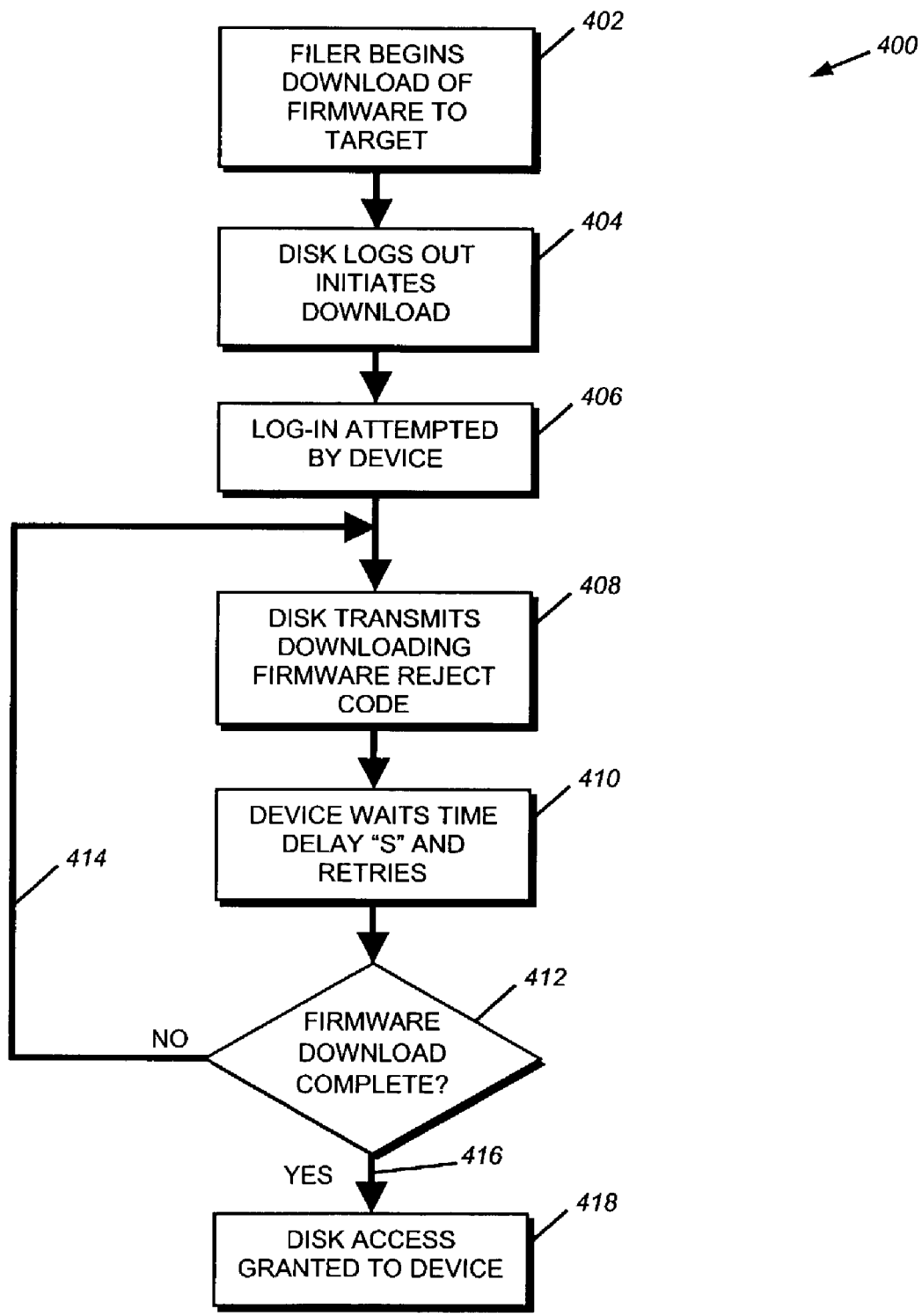
FIG. 4 is a flow chart detailing the steps performed by a disk drive in handling a logging-in device during an underlying firmware download session.

Note that the first error or fault encountered is the reported condition in the reason code. Thus, any preexisting error (other than a firmware download) may be reported as the reason for rejection. However, when no other reason other than firmware download is present, the system device will respond appropriately and await the end of the firmware download condition.

Where the system devices and disk drives are governed by the FC standards described above, the standards should be modified to adopt a specific reason for rejection base upon "downloading firmware." Alternatively, if the downloading firmware reason is not adopted as a standard, then each interested disk drive and system device vendor should provide a common downloading firmware reason to their product's reject code functionality. Also, while this description discusses the particular reject code used in an FC-AL environment, it is expressly contemplated that the principles discussed herein can be applied to other networked storage standards that also employ a low-level protocol to monitor and report the storage device/disk drive's status. Such standards can be modified so that a target storage device provides a specific status code and/or reason for blocking communication with a requesting system device Having described the process for link service log-in and reject to a target device in detail, further reference is now made to the flow diagram at FIG. 4 describing a typical firmware download session 400 in further detail. A filer or other system device initially directs the download of firmware to a target disk in step 402. During this process, the disk logs out of the SAN fabric (step 404) so that the download can proceed. This logout is characterized by the frame LOGO described in section 23.5 of the above-referenced FC-PH 4.3 specification. At some time during the download, a device (such as a disk/SAN ownership layer) attempts to access the disk by logging in (step 406). This can be to check its status or to perform an I/O operation. Since only lower-level protocols are active, there would normally be no reply, and the risk of a cascading reset failure. However, the new low-level downloading firmware reject code of this invention is transmitted by the disk (step 408), and recognized by the driver adapter layer's (340) downloading firmware module/mechanism 342. The accessing device is instructed to wait a given time delay S before retrying its access (step 410). Any associated I/O operations are suspended until the next retry. In one embodiment, the time delay S can be approximately 60 seconds. However, this value can be varied based upon average observed download times so that delay is minimized in most instances.

As the firmware download progresses, the disk continues to issue the reject code on any attempted access (decision step 412 and loop branch 414) until completion of the download. Upon completion, the higher lever protocols are restored, no further reject codes are issued, and full access by the device to the target disk is permitted (branch 416 and step 418).

Hence, the inclusion in the disk of a downloading firmware reject code that is issued only during firmware download, and a corresponding recognition of such a code by the appropriate protocols of the accessing system device ensures that the temporary unavailability of the disk during this downloading period does not result in a SAN-wide reset failure. Rather it is a recognized pause in disk service that the system will wait out until completion.

The foregoing has been a detailed description of the invention. Various modification and additions can be made without departing from the spirit and scope of this invention. For example, while the principles of this invention are described in connection with a SAN-based disk drive, it is expressly contemplated that another type of networked (or SAN-based) storage device can be employed—such as an electro-optical or solid state storage device. Accordingly the term storage device should be taken broadly to include a variety of such data storage mechanisms. Furthermore, it is expressly contemplated that the processes shown and described according to this invention can be implemented as software, consisting of a computer-readable medium including program instructions executing on a computer, as hardware or firmware using state machines and the like, or as a combination of hardware, software, and firmware. Accordingly, this description is meant to be taken only by way of example and not to otherwise limit the scope of this invention.

What is claimed is:

1. A system for reliable update of firmware to a storage device connected to a storage area network fabric comprising:
 a downloading firmware reject code adapted to be issued by the storage device to an accessing system device during a firmware download to the storage device; and
 a downloading firmware reject code mechanism in the system device that recognizes the downloading firmware reject code so as to prevent initiation of a reset request by the system device.

2. The system as set forth in claim 1 wherein the downloading firmware reject code comprises a reject code in a fibre channel specification having a downloading firmware reason for rejection.

3. The system as set forth in claim 1 wherein the mechanism is adapted to cause the system device to wait a predetermined delay time before retrying access to the storage device.

4. The system as set forth in claim 1 wherein the downloading firmware reject code is adapted to be issued in response to a log in to the storage device by the system device.

5. The system as set forth in claim 1 wherein the mechanism resides in a fibre channel adapter layer of the system device.

6. A method for reliable update of firmware to a disk drive connected to a storage area network fabric comprising:
 issuing a downloading firmware reject code from the disk drive to an accessing system device during a firmware download to the disk drive; and
 recognizing the downloading firmware reject code at the system device so as to prevent initiation of a reset request by the system device.

7. The method as set forth in claim 6 wherein the downloading firmware reject code comprises a reject code in a fibre channel specification having a downloading firmware reason for rejection portion.

8. The method as set forth in claim 6 wherein the step of recognizing causes the system device to wait a predetermined delay time before retrying access to the disk drive.

9. The method as set forth in claim 7 wherein the step of issuing the downloading firmware reject code is in response to a log in to the disk drive by the system device.

10. The method as set forth in claim 9 wherein the mechanism resides in a fibre channel adapter layer of the system device.

11. A computer-readable medium for reliable update of firmware to a storage device connected to a storage area network fabric, including program instructions for performing the steps of:
 issuing a downloading firmware reject code from the storage device to an accessing system device during a firmware download to the storage device; and
 recognizing the downloading firmware reject code at the system device so as to prevent initiation of a reset request by the system device.

12. The computer-readable medium as set forth in claim 11 wherein the downloading firmware reject code comprises a reject code in a fibre channel arbitrated loop specification having a downloading firmware reason for rejection portion.

13. The computer-readable medium as set forth in claim 12 wherein the step of recognizing causes the system device to wait a predetermined delay time before retrying access to the storage device.

14. The computer-readable medium as set forth in claim 13 wherein the step of issuing the downloading firmware reject code is in response to a log in to the disk drive by the system device.

15. The computer-readable medium as set forth in claim 14 wherein the mechanism resides in a fibre channel adapter layer of the system device.

16. The computer-readable medium as set forth in claim 11 wherein the storage device comprises a disk drive.

17. A method for quiescing I/O operations to a storage device by a predetermined system device during firmware update of the storage device comprising the steps of:

in response to a log-in of the predetermined system device to perform I/O operations, issuing by the storage device of a downloading firmware reject code in a protocol that remains operative during a firmware download to the storage device, the downloading firmware reject code being recognized by the predetermined system device;

causing the predetermined system device to await a delay time before retrying log-in to the storage device and to suspend the I/O operations each time a downloading firmware reject code is recognized; and upon end of the firmware update, ceasing to issue the downloading firmware reject code and thereby enabling I/O operations to resume.

18. The method as set forth in claim 17 wherein the storage device comprises a disk drive.

19. The method as set forth in claim 17 wherein the downloading firmware reject code comprises a reject code in the fibre channel specification having a downloading firmware reason for rejection portion.

20. The method as set forth in claim 17 wherein each of the system device and the storage device reside on a storage area network fabric.

* * * * *